United States Patent Office 3,326,856
Patented June 20, 1967

3,326,856
SUBSTITUTED BENZYL SUCCINIC ANHYDRIDE CURED EPOXY RESIN COMPOSITIONS
Walter P. Barie, Jr., Pittsburgh, and Charles M. Selwitz, Pitcairn, Pa., assignors to Gulf Research & Development Company, Pittsburgh, Pa., a corporation of Delaware
No Drawing. Filed July 9, 1964, Ser. No. 381,514
14 Claims. (Cl. 260—47)

This invention relates to new epoxy resin compositions. In particular, this invention relates to cured epoxy resin compositions produced by reacting a polyepoxide compound containing more than one oxirane oxygen atom and a substituted benzylsuccinic anhydride.

Epoxy resins are well known in the art and comprise liquid or solid materials containing more than one oxirane oxygen atom per molecule. When the resins are cured or cross-linked they form a very hard material which is excellent for many uses, such as for encapsulation of parts such as electronic parts, as a protective coating, and as an adhesive agent.

Various mono- and dianhydrides are used as agents for curing the epoxy resins by a coupling or cross-linking type process. Various properties are desirable in the cured epoxy resin depending upon the final use to which the epoxy resin is being put. For example, for some applications it is desirable that the hardened or cured epoxy resin have a high heat distortion temperature. The heat distortion temperature (HDT) of an epoxy resin is that temperature at which the epoxy resin composition will deflect 10 mils under a load of 264 p.s.i. (see ASTM–D–648–56). For other applications it is desirable for the cured epoxy resin to have excellent oxidation stability.

In general, an aromatic anhydride or dianhydride when used as the curing agent for epoxy resins results in cured resins having higher heat distortion temperatures than aliphatic anhydrides and dianhydrides having a corresponding number of carbon atoms. The aromatic anhydrides and dianhydrides suffer, however, from their high reactivity resulting in a short pot life. In addition, the aromatic anhydrides and dianhydrides have poor low temperature solubility in the resins.

In accordance with the invention, it has been found that epoxy resin compositions cured with a substituted benzylsuccinic anhydride have unexpectedly high heat distortion temperatures and oxidation stability over epoxy resin compositions cured with an aliphatic substituted succinic anhydride. The substituted benzylsuccinic anhydrides have good solubility in the epoxy resins and the resins have reasonable pot life before hardening.

Any of the epoxy resins well known in the art can be employed in the new compositions of this invention. By an epoxy resin is meant any molecule which contains on the average more than one epoxy group. An epoxy group is a three-membered ring containing one oxygen and two carbon atoms. The one oxygen in the three-membered ring is termed an "oxirane" oxygen atom. Thus, an epoxy resin is any compound containing on the average more than one oxirane oxygen atom. Epoxy resins having molecular weights between about 75 and 4000 are known. The liquid epoxy resins are preferred with the liquid aromatic type epoxy resins being more preferred.

One type of preferred epoxy resin is the glycidyl ether type which has the general formula:

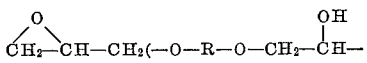
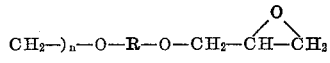

where R is a divalent hydrocarbon radical, preferably an aromatic radical, and $n$ is an integer between 0 and about 18.

The glycidyl ether type epoxy resins are prepared by the reaction of an epihalohydrin with a polyhydric alcohol or phenol. In the formula above, as the ratio of the epihalohydrin to polyhydric alcohol or phenol increases, the value of $n$ decreases. The reaction products of the epihalohydrin with polyhydric alcohol or phenol are complex mixtures of polyethers having terminal 1,2-epoxide groups and in which alternating intermediate aliphatic hydroxy-containing radicals are linked through with oxygens to aliphatic or aromatic nuclei.

The high molecular weight complex polyether compositions are thermoplastic, but are capable of forming thermosetting compositions by further reaction through the hydroxy and/or 1,2-epoxide groups with a cross-linking agent. In order to form these thermosetting compositions, the epoxy resin must have a 1,2-epoxide equivalency greater than one. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Hence, the 1,2-epoxide equivalency of the resin will be a number greater than one, but not necessarily an integer. If the measured molecular weight and epoxide value are given, the 1,2-epoxide equivalency can easily be determined. For example, an epoxy resin having an average molecular weight of 900 and an epoxide value of 0.2 has a 1,2-epoxide equivalency of 1.8.

The epoxide value of an epoxy resin is the number of epoxide groups per 100 grams of resin. This value can be determined experimentally by heating a one gram sample of the epoxy resin with an excess of a pyridine solution of pyridine hydrochloride (obtained by adding sixteen cc.'s of concentrated hydrochloric acid to a liter of pyridine) at the boiling point for twenty minutes and then back titrating the unreacted pyridine hydrochloride with 0.1 N NaOH to the phenolphthalein end point. In the calculations, each HCl consumed by the resin is considered to be equivalent to one epoxide group.

Bisphenol A [2,2-bis(4,4'-hydroxy phenyl)propane] is perhaps the dihydric phenol most frequently employed. Thus, when R in the above formula is:

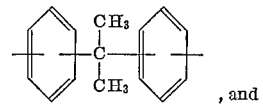, and when $n$ in the above formula is zero, a diglycidyl ether having the following formula results:

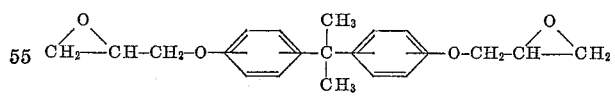

The above ether can be obtained when the mol ratio of epichlorohydrin to Bisphenol A is about 10:1. Lower ratios will produce higher molecular weight polyethers. For the preferred resins which have a molecular weight between about 350 and 600, the mol ratio of epichlorohydrin to Bisphenol A can be between about 1:1 and 10:1. Referring to the general formula above, for the preferred resins, $n$ will vary between 0 and 1. The epoxide equivalent (which is defined as the weight of resin in grams containing 1 gram equivalent of epoxy) should be between about 175 and 300, which is one-half the average molecular weight. The viscosity of the polyether will vary from 3,000 to 30,000 cps. at 25° C. Many commercially available epoxy resins with suitable properties may be employed. For example, suitable resins include "Bakelite ERL–2774"; "Bakelite ERL–3794"; "Epi-Rez 510"; "Epon 820" and "Epon 828," and D.E.R. 331 and 332. "Bakelite" is the trademark of Union Carbide Plastics Co.; "Epi-Rez" is the trademark of Jones-Dabney Co., Division of Devoe and Reynolds Co.; "Epon" is the trademark of the Shell Chemical Co.; and "D.E.R." of the Dow Chemical Co.

There are other non-glycidyl types of epoxy resins such as the commercially available "Unox" resins by Union Carbide which are cycloaliphatic polyepoxides containing more than one oxirane oxygen atom, where at least one oxirane oxygen atom is directly connected to the carbon atoms in the ring. Examples of suitable cycloaliphatic epoxy resins include Unox 201, Unox 206, Unox 269, URRA–0300 and ERLA–0400, all available from Union Carbide Co., and Araldite CY 175, available from Ciba Products, Incorporated.

Another group of commercially available epoxy resins are the "Oxirons" by Food Machinery and Chemical Corporation which are epoxidized butadiene polymers and are characterized as linear aliphatic polyepoxides having vention are hardened or cured by the use of at least one of the oxirane oxygen atoms is directly attached to carbon atoms in the chain. Examples of suitable "Oxirons" include Oxirons 2000, 2001 and 2002.

The epoxy resins used in the compositions of this invention are hardened or cured by the use of at least one anhydride cross-linking agent. The cross-linking agents of this invention impart unexpectedly high heat distortion temperature properties and oxidation stability properties to the final cured resin. The curing agents which are used to prepare the new compositions of this invention are substituted benzylsuccinic anhydrides. By a "substituted benzylsuccinic anhydride" is meant benzylsuccinic anhydride having substituents on the aromatic ring and the carbon atom in the alpha position to the aromatic ring, said substituents being selected from the group consisting of hydrogen, a halogen, an alkyl group having between one and six carbon atoms and an aryl group, and wherein no more than one of the substituents on the carbon atom alpha to the aromatic ring is an aryl group. The substituted benzylsuccinic anhydrides of this invention can be represented by the general formula:

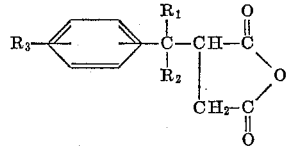

where $R_1$ and $R_3$ can be selected from the group consisting of hydrogen, halogen and an alkyl group having between 1 and 6 carbon atoms; and $R_2$ can be selected from the group consisting of hydrogen, an alkyl group between 1 and 6 carbon atoms, an aryl group and a halogen. It is preferred that $R_1$ and $R_2$ be alkyl groups having between 1 and 3 carbon atoms and that $R_3$ be hydrogen. Examples of suitable aromatic substituted benzylsuccinic anhydrides includes benzylsuccinic anhydride; alpha,alpha - dimethylbenzylsuccinic anhydride; alpha-methylbenzylsuccinic anhydride; para-methyl-alpha,alpha-dimethylbenzylsuccinic anhydride; meta - methyl-alpha, alpha-dimethylbenzylsuccinic anhydride; para - t - butyl-alpha-methyl,alpha-phenylbenzylsuccinic anhydride; para-t-butylbenzylsuccinic anhydride; para-t-butyl-alpha,alpha-dimethylbenzylsuccinic anhydride; para - chloro - alpha, alpha - dimethylbenzylsuccinic anhydride; meta - fluoro-alpha-methylbenzylsuccinic anhydride; para-bromo-alpha-n-hexylbenzylsuccinic anhydride; alpha-methyl-alpha-n-butylbenzylsuccinic anhydride; and alpha,alpha-dichloro-benzylsuccinic anhydride.

The most preferred anhydride is alpha,alpha-dimethyl-benzylsuccinic anhydride.

The aromatic substituted methyl succinic anhydrides can be prepared by any suitable procedure. One suitable procedure is described in U.S. Patent 2,692,270. The alpha,alpha-dimethylbenzylsuccinic anhydride used in the succeeding examples was prepared by this procedure.

In the curing of the polyepoxide compounds in accordance with this invention, it is theoretically necessary to react one epoxide equivalent with one anhydride equivalent. The substituted benzylsuccinic anhydrides have one anhydride equivalent per molecule. The anhydride to epoxide equivalent ratio (the A/E ratio) using the substituted benzylsuccinic anhydride can suitably vary between 0.3 and 1.2 with a preferred A/E ratio of 0.8:1.0 and a more preferred A/E ratio of between 0.85 and 0.95.

The epoxy resin compositions of this invention can be prepared by any method well known in the art. One suitable procedure is to admix the benzylsuccinic anhydride with the epoxy resin at a temperature between about 20° C. and the boiling point of the lower boiling component, i.e. either the benzylsuccinic anhydride or the epoxy resin. Normally, the epoxy resin and benzylsuccinic anhydride can be admixed at room temperature with stirring and in most cases, temperatures between 20° and 50° C. have been found to be satisfactory.

Properties of the hardened epoxy resins are affected by the curing conditions wherein more complete cross-linking occurs. Curing can occur at temperatures between about 50° and 280° C. for time periods as short as five minutes to times as long as two days or more. In general, the higher the curing temperature, the shorter the time required to produce a completely cured epoxy resin product. Before the resin initially solidifies, it can be poured into any suitable mold and be cured under any desirable set of time-temperature conditions. The heat distortion temperature is one of the properties of the final resin which depends in part on the curing temperature employed. The preferred curing temperatures to obtain the highest heat distortion temperatures are between 100° and 240° C. at cure times between 4 and 72 hours with preferred cure times between 8 and 24 hours. Post-curing at elevated temperatures of 180°–240° C. can also be used to increase the heat distortion temperatures.

If desired, diluents and fillers well known in the art can be added to the compositions of this invention. These materials are described, for example, in Chapter 6 of the book "Epoxy Resins—Their Applications and Technology" by H. Lee and K. Neville, McGraw-Hill Book Company, Inc., 1957. Diluents include materials such as monoepoxides and other free-flowing liquids to reduce viscosity. Amounts between 5 and 20 parts per hundred parts of resin (phr.) can be used, with preferred amounts between 5 and 10 phr. Fillers are non-reactive neutral materials such as aluminum oxide, atomized metals, mica and asbestos. Amounts between one weight percent of the resin to several times the weight of the resin can be employed.

In addition, various well-known cure acecelerators, such as tertiary amines, can be added to the compositions. Suitable accelerators include alpha-methylbenzyldimethylamine; benzyldimethylamine; dimethylaminopropylamine; dimethylaminomethyl phenol (DMP–10 by Rohm and Haas); and tris(dimethylaminomethyl)phenol (DMP–30). Strongly acidic materials, such as boron trifluoride, can also be used.

The invention will be further described with reference to the following experimental work.

In all of the series of epoxy resin compositions to be discussed below, the epoxy resin employed, except where otherwise indicated, was Epon 828, a commercial liquid aromatic type epoxy resin sold by Shell Chemical Company which has an epoxide equivalent of 175–210 and a viscosity (cps.) at 25° C. between 10,000 and 20,000. The epoxide equivalent is defined as the weight of epoxy resin containing one equivalent weight of epoxide. Epon 828 is characterized as the reaction product of bisphenol A and epichlorohydrin.

A first series of epoxy resin compositions was prepared using Epon 828 as the epoxy resin and several different cross-linking agents including alpha, alpha-dimethylbenzylsuccinic anhydride (DMBSA); Nadic methyl anhydride (methylbicyclo(2.2.1)heptene-2,3-dicarboxylic anhydride) (NMA); phthalic anhydride (PA); and dodecenyl succinic anhydride (DSA). The A/E ratio, i.e. the equivalents of anhydride per equivalent of epoxide in each case was 0.85/1 except for the DSA formulation where it was 1/1. The DMBSA, NMA and DSA are liquids and are mixed easily with the liquid Epon 828 at room temperature. The PA is a solid and was liquefied by heating to 120° C. with the Epon 828. The resins were cured, that is, maintained at a temprature of 150° C. for 24 hours. Each of the final compositions was subjected to an oxidation stability test, a modified ASTM–D–942–50 which was chosen as the best method available to test the oxidation stability of resins of the epoxy type. The test was modified by the use of 1.7 grams (0.34 gram in each of five dishes) epoxy resin since the 20 grams of resin specified by the method would not fit the dishes. All other test conditions specified by the method were carried out. The results are given in Table I below.

TABLE I—OXIDATION STABILITY TEST OF EPOXY RESINS USING ASTM TEST D-942-50 (MODIFIED)

| Example No. | Resin: Epon 828 cured with— | Hours of Test | | | | |
|---|---|---|---|---|---|---|
| | | 100 | 200 | 300 | 400 | 500 |
| | | Pressure Drop, p.s.i. | | | | |
| 1 | PA | 0 | 0 | 0 | 0 | 0 |
| 2 | DSA | 1 | 5 | 9 | 12 | 14 |
| 3 | NMA | 7 | 9 | 8 | 13 | 13 |
| 4 | DMBSA | 0 | 0 | 0 | 0 | 0 |

Referring to Table I, it can be seen that DMBSA (Example 4) had excellent oxidation stability equal to that of PA. DMBSA is preferred to PA, however, since it is a liquid whereas PA is a solid and therefore much more difficult to incorporate into the epoxy resins. In addition, PA sublimes on heating causing losses when incorporated into resins, whereas DMBSA is a compatible liquid. Furthermore, DMBSA is superior to PA in heat distortion temperature as will be shown below. NMA and DSA which are also liquids have poor oxidation stability in accordance with modified ASTM test D–942–50. That DMBSA is unique, insofar as its oxidation stability in this context is concerned, is apparent from the fact that while it imparts excellent oxidation stability to epoxy resins, DSA, an alkyl substituted succinic anhydride, imparts poor oxidation stability to epoxy resins. It is submitted the results in Table I show the unexpected oxidation stability of epoxy resins cross-linked with DMBSA over epoxy resins cross-linked with other well known liquid materials, such as NMA and alkyl substituted succinic anhydrides, such as DSA.

Comparing the structure of DMBSA with DSA and PA, it would be expected that the DMBSA would behave most like DSA, since the succinic anhydride group in both DSA and DMBSA is directly attached to an alkyl substituent. It is believed the unexpected and beneficial results obtained herein are due to the presence of the aromatic substituent, not directly attached to the succinic anhydride group, but linked to the succinic anyhdride group through a single carbon atom. Thus, even though the anhydride group in DMBSA is not directly connected to the cyclic carbon atoms in an aromatic ring, as is true in PA, nor is the succinic anhydride group itself even directly connected to a cyclic atom in an aromatic ring, nevertheless epoxy resins cross-linked with DMBSA have an oxidation stability equal to epoxy resins cross-linked with PA, an aromatic anhydride. That DMBSA should impart an oxidation stability to epoxy resins equivalent to the oxidation stability imparted by an aromatic anhydride is completely unexpected.

A second series of epoxy resin compositions was prepared using Epon 828 as the epoxy resin and several different cross-linking agents including all of the ones used in Table I above, plus m-isopropyl-alpha, alpha-dimethylbenzylsuccinic anhydride (mi DMBSA); and p-isoproyl-alpha,alpha - dimethylbenzylsuccinic anhydride (pi DMBSA). The A/E ratio in each case was 0.85/1 except with DSA where it was 1/1. The resins were cured by heating at 150° C. for 24 hours. Each of the final compositions was subjected to ASTM test D-648-56 for heat distortion temperature. The results are given in Table II below.

TABLE II.—EFFECT OF SUBSTITUENTS ON SUCCINIC ANHYDRIDE ON THE HDT

| Example No. | Anhydride | HDT, ° C. |
|---|---|---|
| 5 | Dodecenyl Succinic (DSA) | 70 |
| 6 | Nadic Methyl (NMA) | 128 |
| 7 | Phthalic (PA) | 90 |
| 8 | DMBSA | 120 |
| 9 | mi DMBSA | 83 |
| 10 | pi DMBSA | 87 |

Referring to Table II, the alkyl succinic anhydride (DSA) has a relatively low HDT of 70° C., as expected. PA being an aromatic anhydride has a higher HDT of about 90° C. as expected. NMA, a well-known liquid anhydride, has an HDT of about 128° C. Perhaps the HDT of NMA cross-linked epoxy resins is high because the carbon atoms adjacent to the anhydride carbonyls are a portion of a ring structure, that is, are cyclic carbon atoms, resulting in a smaller overall molecule and thus a higher density of cross-linking.

Since DMBSA is not an aromatic anhydride, and the molecular size of DMBSA is greater than NMA, it was expected that the HDT of resins cross-linked with DMBSA would be much lower than for PA and NMA. Referring to Table II, it can be seen the HDT for resins cured with DMBSA is almost as high (120° C.) as the same resin cured with NMA (128° C.).

A comparison of Examples 5, 9 and 10 on Table II shows the effect of cross-linking agents having the same number of carbon atoms, but different molecular configuration, on the HDT of the final cured resins. In Example 5, using DSA, the HDT was only 70° C. while in Examples 9 and 10 using mi DMBSA and pi DMBSA respectively, the HDT increased to 83° and 87° C. respectively. Apparently, by having six of the carbon atoms in the form of an aromatic ring which is connected to the succinic anhydride group through a single carbon atom, an increase in HDT can be effected.

A catalyst, such as a tertiary amine, can also be used to aid in curing the epoxy resin compositions of this invention. A third series of epoxy resin compositions was prepared using Epon 828 as the epoxy resin, alpha,alpha-dimethylbenzysuccinic anhydride as the cross-linking agent and either benzyldimethylamine (BDMA) or tris (dimethylaminomethyl) phenol (DMP-30), a tritertiary amine as the catalyst. The HDT's were determined for these compositions which had an A/E ratio of 0.95:1 and were cured at 150° C. for 24 hours. The results are given in Table III below:

TABLE III

| Example No. | BDMA Catalyst, phr.[1] | HDT, ° C. |
|---|---|---|
| 11 | 0.5 | 115 |
| 12 | 1.0 | 115 |
| 13 | 2.0 | 115 |
| 14 | 3.0 | 123 |
| | DMP-30, phr. | |
| 15 | 0.5 | 99 |
| 16 | 1.0 | 126 |
| 17 | 2.0 | 120 |
| 18 | 3.0 | 121 |

[1] Parts per hundred parts of resin.

Referring to Table III, a comparison of Example 16 with the other examples shows the tri-tertiary amine, DMP–30, is preferred in about a 1 phr. concentration as it results in final compositions having the higher heat distortion temperatures even with lower concentrations of the amine catalyst.

The A/E ratio in all cases was either 0.85 or 0.95, and 1 phr. of BDMA was used as the catalyst. The resins were cured at 150° C. for 24 hours. The results are given in Table VI below.

TABLE VI.—REAGENT RESISTANCE OF DMBSA AND NMA HARDENED RESINS

| Reagents | A/E=0.85/1 (Percent Weight Change) | | | | A/E=0.95/1 (Percent Weight Change) | | | |
|---|---|---|---|---|---|---|---|---|
| | 7 Days | | 28 Days | | 7 Days | | 28 Days | |
| | DMBSA | NMA | DMBSA | NMA | DMBSA | NMA | DMBSA | NMA |
| 10% NaCl | .27 | .39 | .41 | .50 | .18 | .25 | .37 | .48 |
| 3% $H_2SO_4$ | .34 | .33 | .44 | .50 | .26 | .32 | .50 | .57 |
| 10% NaOH | .21 | .23 | .36 | .42 | .36 | .25 | .47 | .53 |
| Acetone | 7.2 | 5.3 | 1 Dec. | Dec. | 11.5 | 3.1 | Dec. | Dec. |
| $H_2O$ (Dist) | .37 | .36 | .44 | .55 | .38 | .32 | .55 | .59 |
| 10% $HNO_3$ | .27 | .30 | .42 | .51 | .29 | .33 | .42 | .57 |

1 Decomposed.

A fourth series of epoxy resins was prepared using Epon 828 to compare alpha,alpha-dimethylbenzylsuccinic anyhdride (DMBSA) with Nadic methyl anhydride (NMA) and phthalic anhydride (PA) at an A/E ratio of 0.85, each of the resins cured at 150° C. for 24 hours. The resins were tested for Rockwell M hardness according to ASTM test D–785–62; Barcol hardness; flexural strength according to ASTM test D–790–61; and Izod impact strength according to ASTM test D–256–56. The results are given in Table IV below.

TABLE IV

| | Anhydride | | |
|---|---|---|---|
| | DMBSA | NMA | PA |
| Hardness: | | | |
| Rockwell M | 93 | 106 | 100 |
| Barcol | 33 | 38 | 35 |
| Flexural Strength, p.s.i. | 16,000 | 12,000 | 15–16,000 |
| Izod Impact Strength, Ft.-lbs./in Notch | 0.4–0.5 | 0.3–0.5 | 0.4–0.5 |

Referring to Table IV, the hardness of the resins using DMBSA was comparable to resins cross-linked with NMA and PA but the flexural strength using DMBSA or PA was 25 percent higher than with NMA.

A fifth series of epoxy resins was prepared using Epon 828; alpha,alpha - dimethylbenzylsuccinic anhydride (DMBSA); and 1 phr. of BDMA as the catalyst. The A/E ratio was varied from 0.75 to 0.95 and the results on the HDT of the finished resin are shown on Table V below. The resins were cured at 150° C. for 24 hours.

TABLE V

| Anhydride | A/E Ratio | HDT, ° C. |
|---|---|---|
| DMBSA | 0.75 | 116 |
| DMBSA | 0.85 | 120 |
| DMBSA | 0.95 | 119 |

Referring to Table V, it can be seen that the optimum A/E ratios to obtain finished resin having the highest heat distortion temperatures is at least 0.80.

A sixth series of epoxy resins was prepared using Epon 828 and either DMBSA or NMA as the cross-linking agents to determine the resistance of the final resins to various chemical reagents according to ASTM test D–543.

Referring to Table VI, all of the resins show excellent resistance to all chemical reagents, although acetone showed a higher percent of weight change over the test period time than the other reagents. This reaction to acetone is not unusual when compared to other resins in the art hardened with monoanhydrides and amine hardening agents. The use of DMBSA as a cross-linking agent for epoxy resins imparts excellent chemical solution resistance properties to the final cured resin. The five solutions of acids, alkali, salt and water used in this series demonstrate that after 28 days less than 1 percent change has occurred.

A seventh series of epoxy resin compositions was prepared using the so-called novolak type of epoxy resin. The novolak resins are the reaction products of (A) a copolymer prepared by the reaction of (1) a phenol represented by the general formula:

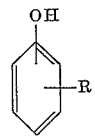

where R can be selected from the group consisting of hydrogen and an alkyl group having between 1 and 20 carbon atoms; and (2) formaldehyde, in the presence of an acid catalyst such as oxalic or sulfuric; and (B) an epihalohydrin such as epichlorohydrin. These resins are cross-linked with DMBSA using either BDMA or DMP–30 as the amine catalyst. The specific novolak resins employed were (1) DEN–438 sold by Dow Chemical Company which is a resin derived by the acid condensation of phenol with formaldehyde which is then reacted with epichlorohydrin to form a polyepoxide. The resulting epoxy resin has an average of 3.6 epoxy groups per molecule; and (2) Kopox 357A sold by the Koppers Company which is a resin derived from the acid condensation of ortho-cresol with formaldehyde which is then reacted with epichlorohydrin to form a polyepoxide. The resulting epoxy resin has an average of 2.7 epoxide groups per molecule.

In the case with DEN–438, the DMBSA was admixed with the resin at room temperature (about 25° C.) and cured at the times and temperatures shown in Table VII below. With the Kopox 357A the DMBSA was admixed at 40°–50° C. and cured as below.

TABLE VII

|  | Example No. | | |
|---|---|---|---|
|  | 19 | 20 | 21 |
| Epoxy Resin: | | | |
| Dow DEN-438 (Wt., Gms.) | 20 | 20 | |
| Kopox 357A (Wt., Gms.) | | | 20 |
| DMBSA (Wt., Gms.) | 20.8 | 20.8 | 18.4 |
| Catalyst: | | | |
| BDMA, phr | 1.5 | | |
| DMP-30, phr | | 1.5 | 2.0 |
| Cure Conditions: | | | |
| Temp., °C | 100 | 245 | 100 |
| Time, Hours | 2 | 64 | 24 |
| Post-Curing Conditions: | | | |
| Temp., °C | 245 | | 200 |
| Time, Hours | 24 | | 16 |
| HDT, °C | 136 | 143 | 140 |

Referring to Table VII, the heat distortion temperatures using the novolac type of resin are much higher than using the Epon 828 type of resin.

An eighth series of epoxy resin compositions was prepared using the non-glycidyl type "Unox 201" as the epoxy resin. "Unox 201" is the Union Carbide tradename for 3,4-epoxy-6-methylcyclohexyl methyl - 3,4 - epoxy-6-methyl cyclohexane carboxylate. In each case DMBSA was admixed with the Unox 201 at ambient or room temperature and cured at the times and temperatures shown in Table VIII below.

TABLE VIII

|  | Example No. | | |
|---|---|---|---|
|  | 22 | 23 | 24 |
| Unox 201, Gms | 20.0 | 20.0 | 20.0 |
| DMBSA, Gms | 21.2 | 23.9 | 26.7 |
| Catalyst: BDMA, phr | 1 | 1 | 1 |
| Curing Conditions: | | | |
| Time, Hrs | 18 | 18 | 18 |
| Temp., °C | 100 | 100 | 100 |
| Post-Curing Conditions—Two Stages: | | | |
| First Stage: | | | |
| Time, Hrs | 4 | 4 | 4 |
| Temp., °C | 200 | 200 | 200 |
| Second Stage: | | | |
| Time, Hrs | 4 | 4 | 4 |
| Temp., °C | 245 | 245 | 245 |
| HDT, °C | 165 | 162 | 148 |

The data in Tables VII and VIII above show that DMBSA is an excellent cross-linking agent for various types of epoxy resins.

The resinous compositions of this invention can be used as prepared in castings, or for filament winding, in preparing laminates, such as glass laminates, etc. One added advantage to the resinous compositions of this invention are the light colors of the cured products. The compositions of this invention also have reasonable pot lives of between 1 and 72 hours or more even when catalyzed with between 0.5 and 5 phr. of catalyzers such as the tertiary amines. The resins have unexpectedly high heat distortion temperatures and possess excellent oxidation stability in addition to superior chemical solution and solvent resistance properties.

Resort may be had to such variations and modifications as fall within the spirit of the invention and the scope of the appended claims.

We claim:

1. A composition of matter comprising the reaction product of a polyepoxide containing more than one oxirane oxygen atom and a benzylsuccinic anhydride having substituents on the aromatic ring and the carbon atom alpha to the aromatic ring, said substituents being selected from the group consisting of hydrogen, an alkyl group having between 1 and 6 carbon atoms, a phenyl group and halogen, and wherein no more than one of the substituents on the carbon atom alpha to the aromatic ring on said anhydride is a phenyl group wherein the ratio of anhydride to epoxide equivalents in the composition is between about 0.3 and 1.2.

2. A composition of matter comprising the reaction product of a polyepoxide containing more than one oxirane oxygen atom and a substituted benzylsuccinic anhydride having the general formula:

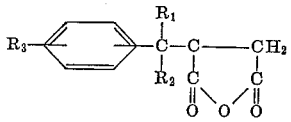

where $R_1$ and $R_3$ are selected from the group consisting of hydrogen, and an alkyl group having between 1 and 6 carbon atoms and halogen, and $R_2$ is selected from the group consisting of hydrogen, an alkyl group having between 1 and 6 carbon atoms, a phenyl group and a halogen, wherein the ratio of anhydride to epoxide equivalents in the composition is between about 0.3 and 1.2.

3. A composition of matter comprising the reaction product of a polyepoxide containing more than one oxirane oxygen atom and alpha,alpha-dimethylbenzylsuccinic anhydride, wherein the ratio of anhydride to epoxide equivalents in the composition is between about 0.3 and 1.2.

4. A composition of matter comprising the reaction product of (1) the reaction porduct containing more than one oxirane oxygen atom of an epihalohydrin and a polyhydric phenol and (2) a benzyl succinic anhydride having substituents on the aromatic ring and the carbon atom alpha to the aromatic ring, said substituents being selected from the group consisting of hydrogen, an alkyl group having between 1 and 6 carbon atoms, a phenyl group and halogen, and wherein no more than one of the substituents on the carbon atom alpha to the aromatic ring on said anhydride is a phenyl group, wherein the ratio of anhydride to epoxide equivalents in the composition is between about 0.3 and 1.2.

5. A composition of matter comprising the reaction product of (1) the reaction product containing more than one oxirane oxygen atom of a epihalohydrin and a polyhydric phenol and (2) alpha,alpha-dimethylbenzylsuccinic anhydride, wherein the ratio of anhydride to epoxide equivalents in the composition is between about 0.3 and 1.2.

6. A composition of matter comprising the reaction product of (1) the reaction product containing more than one oxirane oxygen atom of a epihalohydrin and 2,2-bis(4,4'-hydroxy phenyl) propane, and (2) a substituted benzylsuccinic anhydride having the general formula:

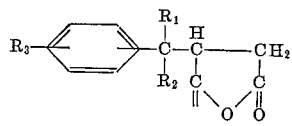

where $R_1$ and $R_3$ are selected from the group consisting of hydrogen, and an alkyl group having between 1 and 6 carbon atoms and halogen, and $R_2$ is selected from the group consisting of hydrogen, an alkyl group having between 1 and 6 carbon atoms, a phenyl group and halogen, and wherein said composition the ratio of anhydride to epoxide equivalents is between about 0.8 and 1.0

7. A composition of matter comprising the reaction product of (1) a cycloaliphatic polyepoxide containing more than one oxirane oxygen atom, where at least one oxirane oxygen atom is directly connected to the carbon atoms in the cycloaliphatic ring, and (2) a substituted benzylsuccinic anhydride having the general formula:

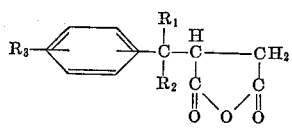

where $R_1$ and $R_3$ are selected from the group consisting of hydrogen, and an alkyl group having between 1 and 6 carbon atoms and halogen, and $R_2$ is selected from the group consisting of hydrogen, an alkyl group having between 1 and 6 carbon atoms, a phenyl group and halogen, and where in said composition, the ratio of anhydride to epoxide equivalents is between about 0.8 and 1.0.

8. A composition of matter comprising the reaction product of (1) a linear aliphatic polyepoxide having more than one oxirane oxygen atom where at least one of the oxirane oxygen atoms is directly connected to the carbon atoms in the chain, and (2) a substituted benzylsuccinic anhydride having the general formula:

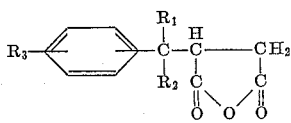

where $R_1$ and $R_3$ are selected from the group consisting of hydrogen, and an alkyl group having between 1 and 6 carbon atoms and halogen, and $R_2$ is selected from the group consisting of hydrogen, an alkyl group having between 1 and 6 carbon atoms, a phenyl group and halogen, and where in said composition, the ratio of anhydride to epoxide equivalents is between about 0.8 and 1.0.

9. A composition of matter comprising (1) a resin comprising the reaction product of (A) a copolymer prepared by the reaction of (a) a phenol represented by the general formula:

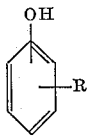

where R is selected from the group consisting of hydrogen and an alkyl group having between 1 and 20 carbon atoms; and (b) formaldehyde in the presence of an acid catalyst, and (B) an epihalohydrin; and (2) a substituted benzylsuccinic anhydride having the general formula:

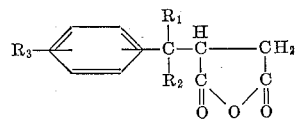

where $R_1$ and $R_3$ are selected from the group consisting of hydrogen, and an alkyl group having between 1 and 6 carbon atoms and halogen, and $R_2$ is selected from the group consisting of hydrogen, an alkyl group having between 1 and 6 carbon atoms, a phenyl group and halogen, and where in said composition, the ratio of anhydride to epoxide equivalents is between about 0.8 and 1.0.

10. A composition of matter according to claim 6 wherein the substituted benzylsuccinic anhydride is alpha,alpha-dimethylbenzylsuccinic anhydride.

11. A composition of matter comprising the reaction product of (1) the reaction product of epichlorohydrin and 2,2-bis(4,4'-hydroxyphenyl)propane which has an epoxide equivalent between about 175 and 210 and a viscosity (cps.) at 25° C. between about 10,000 and 20,000, and (2) alpha,alpha-dimethylbenzylsuccinic anhydride, where in said composition the ratio of anhydride to epoxide equivalents is between about 0.85 and 0.95.

12. A composition of matter comprising the reaction product of (1) the reaction product of epichlorohydrin and 2,2-bis(4,4'-hydroxyphenyl)propane which has an epoxide equivalent between about 175 and 210 and a viscosity (cps.) at 25° C. between about 10,000 and 20,000; (2) alpha,alpha-dimethylbenzylsuccinic anhydride, where in said composition the ratio of anhydride to epoxide equivalents is between about 0.85 and 0.95; and (3) a catalyst comprising a tertiary amine.

13. A composition according to claim 12 wherein the tertiary amine is benzyldimethylamine.

14. A composition of matter according to claim 12 wherein the tertiary amine is tris(dimethylaminomethyl)phenol.

References Cited
UNITED STATES PATENTS 2,692,270　10/1954　Beavers _____ 260—78.4
3,052,650　9/1962　Wear et al. _____ 260—47

WILLIAM H. SHORT, *Primary Examiner.*

T. D. KERWIN, *Assistant Examiner.*